March 21, 1961     L. H. DWORETZKY     2,975,972
FUNCTION GENERATOR
Filed Jan. 21, 1958
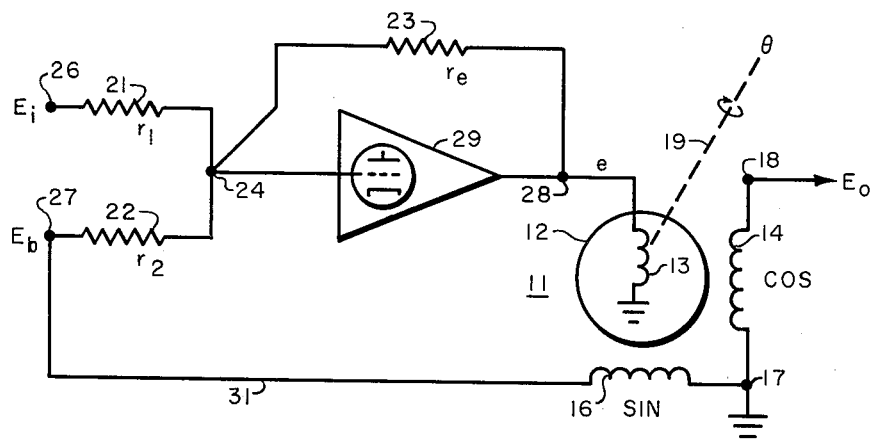
INVENTOR.
LAWRENCE H. DWORETZKY
BY
ATTORNEY.

United States Patent Office 2,975,972
Patented Mar. 21, 1961

2,975,972

FUNCTION GENERATOR

Lawrence H. Dworetzky, Valhalla, N.Y., assignor to General Precision Inc., a corporation of Delaware Filed Jan. 21, 1958, Ser. No. 710,288

1 Claim. (Cl. 235—186)

This invention relates to analog computers and especially to trigonometric function generators. More specifically the invention relates to a computer used in navigation systems to provide the exact instrumentation of the function:

$$E_0 = E_1 (\sec \theta - \tan \theta) \quad (1)$$

The invention employs two basic components, a resolver and a subtracting circuit, and includes a negative function feedback circuit for instrumenting the foregoing equation. Furthermore, the solution is theoretically exact and no approximations are employed. A further advantage of the circuit of the invention resides in the fact that inherent errors of the components cancel each other to some extent, so that the overall error is no greater than that of any component, and in some regions of operation is very much less. Stated in another way, an accurate function is generated using relatively imprecise components.

This outcome is especially noteworthy since the foregoing function is observed to consist of the difference of two functions. Normally this magnifies component errors so that the overall percent error is many times those of the components. Moreover, straightforward instrumentation applying either tapped and shunted linear potentiometers or non-linear potentiometers is found to be expensive while the low tolerable error of the order of 0.1% is not attainable with reliability.

The purpose of this invention is to instrument the stated equation simply and with high precision over the complete ranges of the independent variables.

A further understanding of this invention may be secured from the detailed description and associated drawing, in which the single figure is the schematic wiring diagram of the function generator.

Instrumentation is facilitated by converting Equation 1, by trigonometric manipulation, to the form $$E_0 = \frac{E_i \cos \theta}{1 + \sin \theta} \quad (2)$$

The drawing depicts an instrumentation of this equation. A resolver 11 comprises a rotor 12 having an input winding 13. Two stator windings 14 and 16 are joined together and grounded at terminal 17. Terminal 18 of winding 14 is the output terminal of the function generator and emits the qantity $E_0$. Rotor 12 is mechanically positioned to a desired input angle $\theta$ by means schematically depicted by the dashed line 19.

The function of such a resolver is to multiply the quantity represented by rotor excitation amplitude $e$ by the sine and cosine of the rotor angle $\theta$ and to emit electrical potential amplitudes representative of $e \cos \theta$ and $e \sin \theta$. Such functions can be generated by other electrical and mechanical elements, and such substitution comes within the scope of this invention.

A subtracting component consists of resistors 21, 22 and 23, the three resistors being joined at terminal 24. A potential $E_1$ representing a minuend quantity is applied to terminal 26 of resistor 21 and a potential $E_b$ representing a subtrahend quantity is applied to terminal 27 of resistor 22. The potential $e$ at terminal 28 represents the difference quantity in acordance with the equation $$e = E_i \frac{r_e}{r_1} - E_b \frac{r_e}{r_2} \quad (3)$$

in which $r_1$, $r_2$, and $r_e$ are the resistances of resistors 21, 22 and 23 respectively. The inputs $E_i$ and $E_b$ must be opposite in polarity or phase. This equation assumes negligibly small loading, for which reason an amplifier 29 having high input impedance is preferably employed. Additionally, when the resistances $r_1$ and $r_2$ are greater than resistance $r_e$, the voltage loss may be made up by the gain of amplifier 29.

Such subtracting circuits are well known and widely used, and are described in volume 21 of the Radiation Laboratory series, by Greenwood et al., on page 33.

The amplifier 29 in combination with resistor 23 constitutes a negative feedback amplifier when the fed-back phase is in opposition to the input signal phase applied from resistors 21 and 22 as it here is. When the amplifier by itself has high gain, its overall gain including feedback may be made to approximate unity. The entire circuit, therefore, including the subtracting circuit, may be made to function without gain or loss, so that $$E_1 - E_b = e \quad (4)$$

The schematic circuit of the invention is completed by connecting the amplifier output terminal 28 to the resolver rotor 13 and by connecting the stator coil 16 to subtrahend terminal 27 through conductor 31 so that the coil output quantity, $e \sin \theta$, constitutes the subtrahend quantity $E_b$.

In the operation of this circuit one independent variable quantity $\theta$ constitutes an angular position to which the rotor 12 of the resolver 11 is positioned. The other independent variable quantity is the magnitude $E_i$ of an alternating potential applied to the terminal 26. It is necessary in this embodiment that the signal $E_i$ be alternating because the resolver 11 is an alternating current component. Since $$E_b = e \sin \theta \quad (5)$$

combining (4) and (5), $$e = E_1 - e \sin \theta$$

or $$e = \frac{E_i}{1 + \sin \theta} \quad (6)$$

But $$E_0 = e \cos \theta \quad (7)$$

Combining (6) and (7)

$$E_0 = \frac{E_i \cos \theta}{1 + \sin \theta} \quad (2)$$

which is the desired function.

What is claimed is:

A function generator comprising, a resolver having an input winding, a mechanical input connected to adjust the angular position of said input winding, said resolver additionally including a pair of output windings displaced by 90° relative to each other whereby the signal produced across one output winding is the product of the potential applied to the input winding and the sine of the mechanical input angle and the signal produced across the other input winding is the product of the potential applied to the input winding and the cosine of said mechanical input angle, a subtracting circuit having an input signal and the signal produced across said one output winding applied thereto and producing a difference signal therefrom, an amplifier, negative feedback resistor means interconnecting the output and input of said amplifier maintaining the magnitude of the output thereof the same as that of its input, said amplifier having said difference signal impressed on its input and having the output thereof connected to said input winding, and means obtaining an output signal from said other output winding.

References Cited in the file of this patent

UNITED STATES PATENTS

| | | |
|---|---|---|
| 2,404,387 | Lovell et al. | July 23, 1946 |
| 2,465,624 | Agins | Mar. 29, 1949 |
| 2,467,646 | Agins | Apr. 19, 1949 |
| 2,808,987 | Speller et al. | Oct. 8, 1957 |